W. F. BRUMMER.
BLOWERS FOR INSECT-POWDER.

No. 191,797. Patented June 12, 1877.

WITNESSES
Nat. E. Oliphant
Geo. R. Porter

INVENTOR
William F. Brummer,
per Chas. H. Fowler,
Attorney.

UNITED STATES PATENT OFFICE.

WILLIAM F. BRUMMER, OF MILWAUKEE, WISCONSIN.

IMPROVEMENT IN BLOWERS FOR INSECT-POWDERS.

Specification forming part of Letters Patent No. 191,797, dated June 12, 1877; application filed April 15, 1876.

*To all whom it may concern:*

Be it known that I, WILLIAM F. BRUMMER, of Milwaukee, county of Milwaukee, and State of Wisconsin, have invented certain new and useful Improvements in Blowers for Insect-Powders; and I do hereby declare that the following is a full, clear, and exact description of the same, reference being had to the accompanying drawings, forming a part of this specification, in which—

Figure 1:
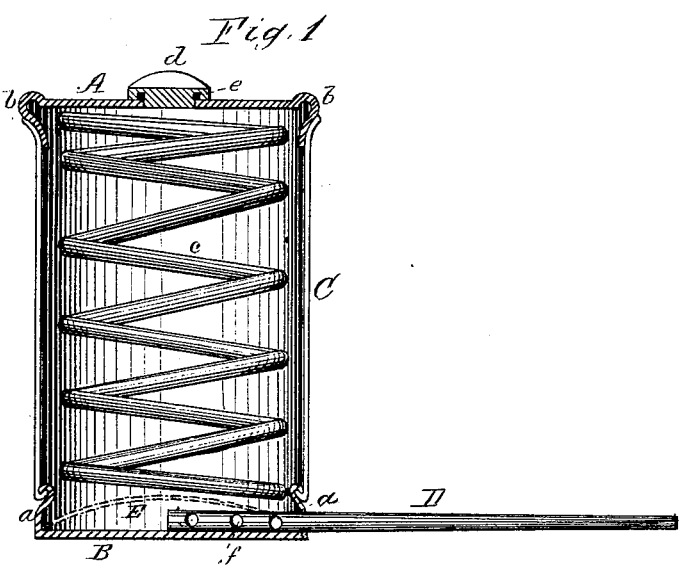
Figure 2:
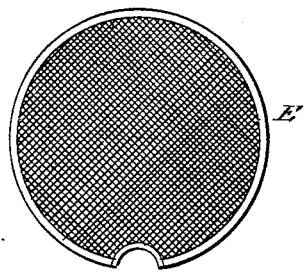

Figure 1 is a longitudinal vertical section of my invention, and Fig. 2 a plan view of the sieve or netting.

The great difficulty heretofore experienced in this class of devices has been the frequent clogging up of the nozzle, and the consequent bursting or breaking the flexible covering of the blower or otherwise affecting its operation. The object and purpose, therefore, of the present invention is to provide a means whereby the powder is relieved of the coarser or larger particles previous to its entering the nozzle, and thereby prevent any possibility of its becoming clogged, and insuring at all times the perfect and successful operation of the blower. And the invention consists in the construction and arrangement of the several parts hereinafter described, and subsequently pointed out in the claim.

In the accompanying drawings, A B represent the top and bottom of the blower, preferably of metal, having flanges $a\ b$, to which is attached a flexible covering, C. Within the blower is a coiled spring, $c$, to expand the same.

The head or top has A a suitable opening, through which the powder is supplied to the blower, and is closed by a screw-cap, $d$, the same having a rubber packing, $e$, to make a perfect air-tight joint between the head and cap. To the bottom B is secured a nozzle, D, said nozzle passing into the blower a short distance, and having openings $f$, so that the supply to the nozzle will be increased, and thereby insure a more perfect spray of powder.

A sieve, E, preferably of wire-gauze, is placed over the bottom B, so that the powder is sifted and the large particles prevented from entering the nozzle, which otherwise would tend to impede the operation of the blower. The sieve E I make concavo-convex in form, so that the coarser particles will lodge in the space around the edge thereof. The under surface of the sieve, being concave, forms a space between it and the bottom B for the sifted powder in its passage to the openings $f$ in the nozzle.

Having now fully described my invention, what I claim as new, and desire to secure by Letters Patent, is—

A blower for insect-powder, consisting of the top A and bottom B, flexible covering C, spring $c$, concavo-convex sieve E, and nozzle D, having openings $f$, substantially as and for the purpose specified.

WILLIAM F. BRUMMER.

Witnesses:
J. B. SMITH,
A. H. SCHATTENBREG.